United States Patent Office 3,681,237
Patented Aug. 1, 1972

---

3,681,237
OIL SPILLAGE CONTROL PROCESS
Julius Orban, Jamaica, and Joseph Brooks, Whitestone, N.Y., assignors to Membrionics Corp., New York, N.Y.
No Drawing. Filed Mar. 26, 1971, Ser. No. 128,485
Int. Cl. E02b *15/04*
U.S. Cl. 210—30         4 Claims

ABSTRACT OF THE DISCLOSURE

A method for controlling oil pollution of open seas or calm waters is provided wherein a stable open cell resilient foam material specially treated with a hydrophobic-oleophilic composition to enhance its oil sorbability and water repellency is employed to remove oil from oil-contaminated waters.

---

Pollution of the open seas and the relatively calmer inland waterways due to oil spillage is an ever present and growing problem with no apparent feasible solution. The problems created by such pollution include damage to aquatic and bird life, water resources, harbors, recreational beaches as well as health hazards to the nearby human population. Moreover, the economic loss suffered by oil companies resulting from oil-spillage is enormous.

A number of different approaches have been suggested for dealing with oil-spillage encompassing mechanical systems as well as chemical systems. The mechanical systems have proven to be fairly adequate for control of oil-spillage in calm waters where waves do not pose a problem, but are unacceptable for use in rough waters.

The mechanical systems which are usually referred to as oil skimmers consist primarily of three types, namely, weir, drum and belt. The weir type skimmer removes oil from the surface of water by allowing the oil to overflow a weir into a collecting device while holding back water against the weir. The drum type skimmer and belt type skimmer employ a rotating drum or a continuous closed-loop belt, respectively, the surface of which is covered with an oil absorbent material to absorb oil from water. The oil is then squeezed or scraped from the surface of the drum or belt.

The efficiency of these types of skimmers is largely dependent on their use in calm waters inasmuch as they operate by closely following the movement of the water's surface so that the liquid recovered is primarily oil and not water. It has been found that waves greater than six inches prevent most skimmers from following the movement of surface water, and waves greater than two feet prevent the efficient operation of even the largest skimmers. Notwithstanding seasonal variability of sea conditions, an average wave height of at least three feet is prevalent so that present skimmers cannot be employed in open seas.

The oil-cleanup chemical systems are classified as dispersants, which are essentially surface-active agents, sinking agents, absorbers, and burning promoters. The dispersants break up continuous oil slicks by dispersing floating oil into very fine droplets thereby increasing oil surface area and facilitating oixdation and biodegradation of the oil.

Although rough waters present no appreciable problem with chemical type systems, the efficiency thereof is highly dependent upon the viscosity, crude light oil being dispersed better than crude heavy oil. Moreover, such dispersants can have an adverse effect on marine life.

The sinking agents are finely divided, high density, water insoluble inorganics such as sand, clay or chalk, which can be treated to enhance olephilicity, and function by sinking through the oil slick carrying floating oil with it. Sinking agents are effective with heavy crude oil, but their efficiency is limited depending upon their ability to agglomerate into a sinking lump. Furthermore, it is quite possible that the oil-soaked sinking agents on the sea bottom could eventually release the absorbed oil.

The absorbers, which include materials such as papers, straws, foams or other porous materials absorb floating oil by capillary action and oil affinity. The oil-soaked adsorbers must be disposed of, for example, by burning. The efficiency of these agents decreases with increasing oil viscosity.

Burning promoters, which include Cab-O-Sil ST-20 or pyraxon powder, promote rapid oxidation of oil. These materials can only be employed for controlling small oil spills and patches, away from the spilled source and human population.

It has now been found that oil-spillage can be efficiently controlled and cleaned up with concomitant recovery of substantial quantities of valuable oil, practically regardless of sea conditions or oil viscosity, and without creating a future source of pollution, by physically removing oil, substantially free of water from oil-contaminated waters by soaking oil up into a stable open cell resilient foam material especially treated with a hydrophobic-oleophilic treating or coating composition to enhance oil sorbability and water repellency of the foam, and thereafter physically removing and recovering the sorbed oil from the foam. The foam can follow wave movement thereby making it operable on open seas. In addition, use of this system does not entail or require dispersing, sinking or burning of oil.

Thus, in accordance with the present invention, a method is provided for controlling oil pollution on open seas or calm waters, which comprises sweeping or drawing over the oil-contaminated waters a stable open cell resilient foam material especially treated and coated with a hydrophobic-oleophilic composition, thereby causing oil to be sorbed in and on the foam, and separating the oil from the foam. The separated oil is substantially water-free and can be recovered and in most cases employed for intended uses without need of further processing.

Further in accordance with the present invention, a hydrophobic-oleophilic treating composition is provided for use in enhancing oil-sorbability and water repellency of the stable open cell resilient foam material, which comprises an oleophilic agent, for example, one or more straight chain saturated aliphatic hydrocarbons containing from about four to about twelve carbon atoms and/or one or more cycloalkanes containing from about five to about ten carbon atoms, a solvent, and one or more bonding agents to aid in bonding the oleophilic agent to the foam material; and a hydrophobic agent comprising a water repellent agent and a bonding agent which can be a polymer adhesive or wax dispersion in a solvent.

The use of the terms "sorb," and "sorbing," "sorption" and "sorbability" as employed herein refers to and is intended to include the phenomena of absorption and/or adsorption, that is accumulation of oil on the surface of the coated foam and as well as in the inner cells thereof.

The foam material which is employed herein is an open cell cellular plastic or foam of rigid or semi-rigid construction, preferably strong enough to support its own weight, but sufficiently flexible and resilient so as to be capable of being compressed between mechanical rollers or other compression apparatus and upon release from compression returning to its substantially original shape. Thus, the foam material should have a modulus of elasticity at 23° C. of from about 50,000 to greater than 100,000 p.s.i. and a density within the range of from about 0.01 to 0.20 g./cc.

Although it is preferred that the foam material be of substantially open cell construction, the foam may contain a small fraction of closed cells to increase buoyancy thereof. Thus, for example, the foam can have a ratio of open cells: closed cells of within the range of from about 10,000:1 to about 5:1.

Examples of foam material which can be employed herein include, but are not limited to, polyurethane foam, foamed or expanded polyvinyl chloride, phenol-formaldehyde resin foams containing at least 80% open cells, foamed elastomers such as natural rubber foam, styrene-butadiene rubber foam, polychloroprene foam, chlorosulphonated polyethylene - ethylene - propylene terpolymer foam, butyl rubber foams and polyacrylate foams.

The hydrophobic-oleophilic treating composition is comprised of a hydrophobic agent (A) and an oleophilic agent (B) in a weight ratio of A:B within the range of from about 1:4 to about 1.5:1 and preferably from about 1:3 to about 1:1.

The hydrophobic agent is generally comprised of a water repellent agent which serves as a physical barrier to prevent water from passing through the cells of the foam material and usually a bonding agent employed in either or both the hydrophobic agent, olephilic agent and preservative agent can be of the air drying, solvent-responsive or chemically-reactive type.

The bonding agents include a base or binder which is the component primarily responsible for the adhesive forces which hold the hydrophobic, oleophilic and preservative agents to the walls of the foam material. In addition, solvents, thinner, diluents, catalysts, hardners, fillers, extenders, preservatives fortifiers and/or carriers can be included. All of the ingredients of the bonding agents are of conventional types and examples of such can be found in standard references. Examples of binders include polymer waxes which serve to bond the water-repellent agent to the cell walls and surfaces of the foam material as well as a water-repellent agent. The water-repellent agent is normally employed in a weight ratio to the adhesive of within the range of from about 1:1 to about 50:1 and preferably from about 4:1 to about 10:1.

As the water-repellent agent there can be employed substantially any of the known water-repellents for paper, leather, textiles and concrete and masonry. Thus, for example suitable water-repellent agents include, but are not limited to, metal salts and oxides such as aluminum salts, aluminum acetate, zirconium oxychloride, stearatochromic chloride, proteins, such as glue, insolubilized with aluminum compounds or formaldehyde, tannin or dichromates, condensation nitrogen-base resins such as Permel Resin B, Norane 16, and Phobotex FTC, silicon compounds such as methyltrichlorosilane, long-chain silicon acetates, silicon resins, such as poly (dimethylsiloxanes), combinations of organo-titanium compounds such as alkyltitanates and silicone compounds, fluorochemicals such as perfluorobutyric acid, fluorinated polyacrylates, chromium coordination complexes of perfluorocarboxylic acids, polyethylenimines having perfluoroacyl side chains, fluoroalkyl-siloxane polymers, combinations of fluorchemicals with wax, with pyridinium salts such as stearamidomethyl pyridinium chloride, or with resin-type water repellents such as silicone resins, or urea- or melamine-formaldehyde resins.

As the bonding agent or adhesive which causes the water-repellent agent to adhere to the surface and/or cell walls of the foam there can be employed natural waxes, such as petroleum waxes, vegetable waxes, such as carnauba wax or candelilla wax, animal and insect waxes, such as beeswax and sperm oil and spermaceti wax, other mineral waxes, such as peat wax and montan wax, as well as synthetic waxes such as polyethylene waxes, Fisher-Tropsch paraffins and microcrystalline wax.

The hydrophobic agent is formulated as a solution or dispersion by mixing the water-repellent agent with the adhesive or binder in a solvent such as paraffins, aromatic hydrocarbons and alcohols at temperatures high enough to melt the wax and cause the ingredients to be dispersed in the solvent.

The oleophilic agent is a mixture or dispersion of binders and oleophilic enhancers. As the oleophilic enhancers there can be employed one or more straight chain saturated hydrocarbons having from four to about twelve carbon atoms such as n-butane, n-pentane, n-hexane, n-heptane, and n-octane as well as cycloalkanes containing from about five to about ten carbon atoms such as cyclopentane, cyclohexane and cycloheptane.

The straight chain alkanes are employed in a molar ratio to the cycloalkanes within the range of from about 5:1 to about 12:1 and preferably from about 6:1 to about 9:1.

The oleophilic agent also includes as a solvent or softening agent for the alkanes and cycloalkanes one or more solvents such as aromatic hydrocarbons for example, benbenzene, ethylbenzene, naphthalenes, toluene or xylene. Usually the solvent will be present in an amount of from about 0.5 to about 4% based on the total weight of alkane and cycloalkane present.

To ensure that the oleophilic agent is retained in the cell walls and on the surface of the foam material the agent includes a binder as generally hereinbefore described or combinations of binders, which can include an oxygen-containing compound such as naphthenic acid, phenol, camphonanic, or cresols; a sulfur containing compound such as hydrogen sulfide or a disulfide such as carbon disulfide or thiophene, as well as alkyl mercaptans, methyl ethyl sulfide, or pentamethylene sulfide, a nitrogen containing compound including derivations of quinoline, such as pyridine, picolines, or acridine as well as piperidine, indole or pyrrole and a nonhomogeneous asphaltic composition including asphaltenes and a neutral resin such as natural wax jelly. In addition, organometallic compounds such as vanadium or nickel organics can be present.

Typical oleophilic agents employed in the present invention are exemplified as indicated below in Table A.

TABLE A

Oleophilic agent

| Ingredient: | Range, weight percent |
|---|---|
| Oleophilic enhancer— | |
| Straight chain saturated hydrocarbon | 55–82 |
| Cycloalkane | 8–10 |
| Aromatic hydrocarbon solvent | 5–10 |
| Binding agent ingredients: | |
| Oxygen-containing component | 1–2 |
| Sulfur-containing compound | 0.1–0.3 |
| Nitrogen-containing compound | 0.1–0.2 |
| Asphaltic compounds | 0.2–0.3 |

If desired a combination hydrophobic agent-oleophilic agent can be employed in a single treating dispersion. Thus, for example silicone or organosilanes as disclosed in U.S. Pat. No. 3,464,920, which are both hydrophobic and oleophilic, can be employed in combination with any of the adhesives or binders mentioned hereinbefore.

The coating of the foam material with the hydrophobic-oleophilic composition makes it possible for the foam to achieve an oil sorption ratio of in excess of forty times the weight of the coated foam as opposed to untreated foam which normally sorbs only from one to two times its weight of oil under comparable conditions. In fact, it is the coating which enhances oil sorption and water-repellency of the foam to such a significant extent which makes the present method efficient and economical to perform and an important advance in the control of oil pollution of waters.

Although the precise mechanism involved in increasing oil-sorbability and water repellency through the use of the coating material of the invention is not fully understood, it is believed that the coating material enters and is deposited and retained in the inner cellular surfaces of the foam as well as on the external surfaces thereof. That is, an environment is provided in which substantially all surrounding walls of substantially each open cell of the foam are coated with the hydrophobic-oleophilic material. In this way all open cells can become filled with oil as well as the external surfaces thereof. This is to be contrasted with conventional oil sorption systems which rely on oil being retained (absorbed) solely on the surface of the collection device.

One of the key advantages of employing the oil-spillage control method of the invention is that substantial quantities of oil can be recovered from the coated foam material and reused without further processing and the coated foam material, once freed of sorbed oil, can be reused repeatedly with little or no effect on the oil sorbing capacity and water-repellency of the foam.

It is known in the art that petroleum harbors many micro-organisms including protozoa, algae, bacteria, yeast and molds which utilize hydrocarbons as nutritional materials. For example, see Beerstetcher, "Petroelum Microbiology," Elsevier Press, Inc. (1954), pp. 166–174. These micro-organisms can contribute to the biological degredation of the oil-sorbing, water, repelling characteristics of the coating and foam. Accordingly, it is preferred to include as an additive to the coating composition of the invention a preservative which can include anti-bacterial and anti-fungal agents which destroy such micro-organisms or at least significantly retard their growth and thereby inhibit such biodegradation of the coating and foam. As examples of such anti-bacterial and anti-fungal agents which can be employed, there can be mentioned copper naphthenate, copper 8-hydroxyquinoline, salicylanilide, the sodium salt of o-phenyl phenol, halogenated bisphenols, such as bis (2-hydroxy-3,4,6-trichlorophenyl) methane and bis (2-hydroxy-3,5-dichlorophenyl) sulfide, halogenated carbanilides, such as 3,3',4'-trichlorocarbonilide, 3,4,4'-tribromocarbanilide and 3,4,3',4'-tetra-chlorocarbanilide, halogenated salicylanilides, such as 3,5,4'-triboromosalicylanilide, sulfonamides, as well as other anti-bacterial and anti-fungal agents known in the art.

In preparing the preservative treating composition or agent, the antibacterial-antifungal agents are suspended in a solvent such as water, alcohols, aromatics, or alkanese at a concentration of from about 0.01 to about 5.0% by weight active ingredients.

In carrying out the method of coating the foamed material, the foam is subjected to an oleophilic treatment, a water-repellent treatment and a preservative (antibacterial-antifungal) treatment. The order of treatment is not critical, although the above order is preferred.

The oleophilic treatment is carried out by forming an oleophilic treating composition as outlined hereinbefore by mixing the various ingredients at a temperature of from about 0.01 to about 50° C., until a solution or fairly uniform dispersion is obtained. A slab of open cell foam material is immersed in the oleophilic mixture which is at a temperature within the range of from about 25 to about 45° C. until an amount of oleophilic agent of from about 2 to about 15 and preferably from about 5 to about 10 times the weight of foam material is sorbed by the foam. The foam material is then compressed or wrung out to reduce the amount of oleophilic agent sorbed therein to from about 1 to about 4 and preferably from about 1.5 to about 3 times its weight and then is dried.

The foam material is then immersed in a dispersion of hydrophobic agent and is allowed to sorb hydrophobic agent (prepared as described above) in an amount from about 2 to about 5 times its own weight. The form material is then wrung out to reduce the amount of hydrophobic material sorbed to about 1 to about 1.5 times its own weight and is then dried.

The so-treated foam material can then be immersed in a preservative dispersion and is allowed to sorb from about 2 to about 5 times its own weight of such dispersion. The foam is then wrung out to reduce the amount of preservative dispersion sorbed to about 1 to about 1.5 times its own weight and is then dried.

The foam material is now coated with the hydrophobic-oleophilic composition and is ready for use.

In order to most effectively employ the coated foam material, the spilled oil should be temporarily contained in a given area. This can be done in part by isolating the spill source and preferably stopping the spill. Further, through the use of strategically placed booms, spreading of oil can be reduced and the spilled oil can be temporarily confined and concentrated in a given area. The booms can be of the canvas skirt type, with reinforcing bars, or of the plastic type, all with positioning floats. Because of the flexibility and buoyancy of the booms, the height of the waves is of no real concern, unless the waves and winds are so strong that the booms cannot be positioned; in such case the oil will be dispersed by the wind thereby resolving the pollution problem. The coated foam material which can be in the form of large slabs, for example 10 feet by 1 foot by 1 inch, is held in a net and suspended between two or more boats or barges drawn by motorboats and drawn or swept across the oil-contaminated waters. When the foam material is saturated with oil, for example, contains from about 40 to about 65 times its weight in oil, the net containing the foam material is picked-up and drawn through a series of mechanical rollers or other compression device to squeeze the oil from the foam oil which contains only negligible amounts of water, for example less than 1% by weight, is recovered for future use. The machinery to draw in or pick-up the net and the mechanical compression equipment can be of conventional type and are preferably fitted on one or both of the drawn barges. A third boat can be employed to broadcast the net by carrying it between the locks of the net pick-up devices of the two barges.

The following examples further illustrate the invention.

EXAMPLE 1

A hydrophobic-oleophilic treating composition is prepared as follows:

The hydrophobic portion is formulated by mixing 100 g. of Zelan with 10 g. of natural wax at a temperature of about 80° C. in the presence of 10,000 g. of alcohol as a solvent, in a 10 gal. tank, until all ingredients are dispersed in the solvent.

The oleophilic portion is prepared by mixing the ingredients shown in Table I at 30–40° C. in a 10 gal. tank until all solids are dispersed.

TABLE I

Oleophilic agent

| Ingredient: | | |
|---|---|---|
| n-Heptane | weight percent | 50–60 |
| n-Hexane | do | 6–7 |
| n-Pentane | do | 3–5 |
| n-Butane | do | 3–5 |
| Cyclohexane | do | 8–10 |
| Benzene | do | 1–2 |
| Ethylbenzene | do | 1–2 |
| Naphthalene | do | 1–2 |
| Toluene | do | 1–2 |
| Xylene | do | 1–2 |
| Naphthalenic acid | do | 1 |
| Phenol | do | 1 |
| Hydrogen sulfide | do | 0.1 |
| Carbon disulfide | do | 0.1 |
| Quinoline | do | 0.2 |
| Asphaltenes | do | 0.1 |
| Neutral resin | do | 0.1 |
| Vanadium | p.p.m. | 4–5 |
| Nickel | p.p.m. | 4–5 |

The preservative composition is prepared by mixing copper naphthenate (0.1–0.2%), copper-8-hydroxyquinoline (5–8 p.p.m.) or salicylanilide ((0.6%) plus the sodium salt of o-phenylphenol (0.6%) in ethyl alcohol (95%) as a solvent.

EXAMPLE 2

The foam material which is open cell polyurethane (modulus of elasticity=80,000 p.s.i. and density=0.02 g./cc.) is coated with oleophilic agent by immersing a polyurethane slab (10 ft. x 1 ft. x 1 in. weighing about 1.4 lbs.) in a tank containing about 25 gal. of the above oleophilic composition at a temperature of about 35° C. for about 10 minutes thereby causing the polyurethane to sorb about 5-10 times its own weight of oleophilic agent.

The polyurethane is then wrung out to reduce the amount of oleophilic agent sorbed to about 2 times its weight. The polyurethane is then dried.

Thereafter, the polyurethane is immersed in a tank containing about 25 gal. of the hydrophobic composition prepared in Example 1 at a temperature of about 35° C. for about 10 min. and thereby sorbs about 2-5 times its weight of hydrophobic agent. The polyurethane is then wrung out to reduce sorbed hydrophobic agent to about its own weight. The foam is then dried.

The polyurethane is then immersed in a tank containing about 25 gal. of preservative dispersion prepared in Example 1, at a temperature of about 35° C., for about 10 min. and thereby sorbs about 2-5 times its weight of preservative dispersion. The foam is then wrung out to reduce its sorbed preservative to about its own weight and then is dried.

The cells and surfaces of the polyurethane foam are now coated with the hydrophobic-oleophilic composition of the invention and the foam is ready for use in controlling oil-pollution of waters.

EXAMPLE 3

The coated polyurethane can be employed for oil clean-up and recovery as follows.

It is assumed that an oil spill from a tanker has occurred. The leaking source is stopped by standard means such as sealing, gelling or pumping. A series of booms are strategically deployed around the tanker and the oil slick to temporarily contain the spilled oil. Two barges, each pulled by a tugboat, are fitted with machinery to enable a nylon net, holding a slab of coated polyurethane, to be suspended and held between the barges. The barges are also filled with net pick-up devices and a series of mechanical rollers and oil storage tanks to compress the oil soaked foam and store the oil recovered therefrom.

The two tugboats draw the two barges with the suspended net containing the coated foam into the contained oil slick area thereby sweeping the oil slick with the coated foam and causing the foam to sorb only oil and substantially no water (less than 1%). The coated foam sorbs from 40 to 60 times its weight of oil in less than about 1 to 2 minutes, so that 1 pound of coated foam sorbs from 40 to 60 pounds of oil, whereas the uncoated foam under comparable conditions and time sorbs only about 1.5 times its weight in oil plus significant amounts of water.

The oil soaked foam is then dragged onto one of the barges and run through a series of nip rollers which squeeze the oil from the foam inside the net. The recovered oil is held in a storage tank and the coated foam can be used repeatedly for many more cycles, as needed, until oil clean-up has been completed.

It will be apparent that the size and number of slabs of foam material employed, as well as the number of boats and barges, will vary depending upon the severity of the spill and the area it affects.

What is claimed is:

1. A method for controlling oil pollution of open seas and calm waters with concomitant recovery of oil, which comprises sweeping or drawing over the oil-contaminated waters a coated open cell foam material causing oil and substantially no water to be sorbed in and on the foam, and separating and recovering the oil from the foam, said foam material being stable and resilient and the cells of which being coated with a hydrophobic-oleophilic treating composition and a preservative comprising antifungal-antibacterial agents.

2. A method in accordance with claim 1, wherein the coated foam is reused repeatedly after each removal of sorbed oil therefrom.

3. A method in accordance with claim 1, wherein the oil sorbed on the coated foam is in an amount of from about 35 to about 65 times the weight of the foam.

4. A method in accordance with claim 1, wherein sorbed oil is squeezed from the coated foam by passing the oil-soaked foam between mechanical rollers.

References Cited

UNITED STATES PATENTS

| | | | |
|---|---|---|---|
| 3,334,042 | 8/1967 | Teitsma | 210—40 X |
| 3,382,170 | 5/1968 | Pape | 210—DIG. 21 |
| 3,464,920 | 9/1969 | Pirson et al. | 210—36 X |
| 3,581,899 | 6/1971 | Hunter | 210—DIG. 21 |

SAMIH N. ZAHARNA, Primary Examiner

U.S. Cl. X.R.

106—2; 117—98, 138.8; 210—36, 40, DIG.21